United States Patent [19]

Cohen

[11] 3,846,767

[45] Nov. 5, 1974

[54] METHOD AND MEANS FOR RESETTING FILAMENT-FORMING MEMORY SEMICONDUCTOR DEVICE

[75] Inventor: Morrel H. Cohen, Chicago, Ill.

[73] Assignee: Energy Conversion Devices, Inc., Troy, Mich.

[22] Filed: Oct. 24, 1973

[21] Appl. No.: 409,135

[52] U.S. Cl. .............................. 340/173 R, 307/317

[51] Int. Cl. .............................................. G11c 13/00

[58] Field of Search .................... 340/173 R, 173 SP

[56] References Cited

UNITED STATES PATENTS

| | | | |
|---|---|---|---|
| 2,784,389 | 3/1957 | Kelly | 340/173 R |
| 3,530,441 | 9/1970 | Ovshinsky | 340/173 R |
| 3,571,809 | 3/1971 | Nelson | 340/173 R |

*Primary Examiner*—Terrell W. Fears

*Attorney, Agent, or Firm*—Wallenstein, Spangenberg, Hattis & Strampel

[57] ABSTRACT

A method of resetting a filament-type memory device including spaced electrodes between which extend a body of generally amorphous substantially non-conductive memory semiconductor material which, when a set voltage pulse in excess of a given threshold voltage value and duration is applied to said electrodes, has formed therein a crystalline low resistance filamentous path resettable into a generally amorphous condition by application of one or more reset voltage pulses. The resetting method comprises first applying to the electrodes one or more voltage pulses which produce a reset current pulse or pulses which substantially completely convert the crystalline filamentous path to a condition where the memory device has its maximum resistance and threshold voltage value, and then applying to said electrodes reset voltage pulses each in excess of the maximum threshold voltage value of the memory device which voltage pulses cause additional reset current pulses to flow through the high resistance filamentous path to homogenize the same and prevent crystallization from developing therein due to high ambient temperature storage of the memory device.

9 Claims, 5 Drawing Figures

METHOD AND MEANS FOR RESETTING FILAMENT-FORMING MEMORY SEMICONDUCTOR DEVICE

BACKGROUND OF THE INVENTION

The present invention relates to the resetting of memory devices of the type disclosed in U.S. Pat. No. 3,271,591 granted Sept. 6, 1966 to S. R. Ovshinsky.

In recent years, there has been developed a memory matrix utilizing the non-volatile resettable characteristic of these memory devices. Such a memory matrix has been integrated onto a silicon semiconductor substrate as disclosed in U.S. Pat. No. 3,699,543 granted Oct. 17, 1972 to Ronald G. Neale. As disclosed in the latter patent, the matrix is formed within and on a semiconductor substrate, such as a silicon chip, which is doped to form spaced, parallel X or Y axis conductor-forming regions within the body. The substrate is further doped to form isolating rectifier or transistor elements for each active crossover point. The rectifier or transistor elements have one or more terminals exposed through openings in an outer insulating coating on the substrate. The other Y or X axis conductors of the matrix are formed by spaced parallel bands of conductive material deposited on the insulating covered semiconductor substrate. The memory matrix further includes a deposited memory device including a thin film or amorphous memory semiconductor material (e.g. 1.5–4 microns in thickness) on the substrate, adjacent each active cross-over point of the matrix. Each film of memory semiconductor material is connected between the associated Y or X axis band of conductive material in series with the isolating rectifier.

The preferred memory semiconductor materials are tellurium based chalcogenide glass materials which have the general formula:

$$Ge_ATe_BX_CY_D$$

where:

A=5 to 60 atomic percent

B=30 to 95 atomic percent

C=0 to 10 atomic percent when $x$ is Antimony (Sb) or Bismuth (B$i$)

or

C=0 to 40 atomic percent when $x$ is Arsenic (A$s$)

D=0 to 10 atomic percent when $y$ is Sulphur (S)

or

D=0 to 20 atomic percent when $y$ is Selenium (Se)

a preferred composition is $$Ge_{15}Te_{81}Sb_2S_2$$

Each of the memory devices used in the memory matrix referred to is a two-terminal bistable device where the film of memory semiconductor material is capable of being triggered (set) from a stable high resistance initially amorphous condition into a stable low resistance condition when a set voltage pulse of a relatively long duration (e.g. 1–100 milliseconds or more) applied to spaced portions of this layer exceeds a given threshold voltage value. Such a voltage pulse causes set current to flow in a small filament (generally under 10 microns in diameter) which current is believed to heat the semiconductor material above its glass transition temperature where sufficient heat accumulates under the relatively long duration to cause a slow cooling of the material which crystallizes the material in the filament. The magnitude of the set current pulse is determined by the degree to which the amplitude of the set voltage pulse exceeds the threshold voltage value of the memory device and the circuit resistance involved. Set current pulses are commonly in the range of from about 2 milliamps to about 15 milliamps.

The crystallized low resistance filament remains indefinitely, even when the applied voltage and current are removed, until reset to its initial amorphous high resistance condition as by the feeding of a high current short duration reset current pulse therethrough. Such a reset current pulse generally has a value of from about 100–200 milliamps and a duration of about 10 microseconds or less. (The magnitude of the voltage pulse which produces such a reset current pulse need have no relation to the threshold voltage value of the memory device and it was at one time thought desirable from the standpoint of reliability that the magnitude of such a voltage pulse be less than the maximum threshold voltage value of the memory device.) Such a high current reset pulse is believed to heat the entire filament and portions of the semiconductor material beyond the limits of the filament to a critical temperature above the glass transition temperature of the material. When a reset pulse is terminated, the material quickly cools and returns to a generally amorphous state.

The heat generated by a reset current pulse is a function of both the geometry of the memory device and the size of the crystalline filament formed by the set current pulse. A relatively small filament, which is produced by relatively low amplitude set current pulse, produces a greater amount of heating for a given reset current pulse than does a relatively large filament which is produced by a relatively high set current pulse. Thus, to develop sufficient heat in a relatively large filament to reach the critical temperature for reset purposes was heretofore believed to require a relatively large reset current pulse. For a typical memory device manufactured by Energy Conversion Devices, Inc. of Troy, Michigan, a 2.5 millisecond set current pulse of 7½ milliamps requires about a 150 milliamp reset current pulse to produce sufficient heat substantially to heat the entire filament to a temperature above the glass transition temperature where termination thereof will reset substantially the entire filament to its amorphous maximum threshold voltage value and resistance condition. Since there is a possibility that such a reset current pulse will not completely reset the entire filament to an amorphous state (possibly because of the structural variation in the size of the crystallites and because the centermost portions of the crystalline filament will cool more slowly than the outermost portions thereof), it has been suggested to feed a few additional reset current pulses in succession during each resetting operation to ensure substantially the complete resetting of the crystalline filament to its original amorphous state where it has a maximum resistance and threshold voltage value state. In one such resetting operation, the number of high current reset pulses applied during a resetting operation was controlled by a circuit which measured the resistance or threshold voltage value of the memory device being reset, and if the memory device had a lower than maximum resistance or threshold voltage value, an additional similar current reset pulse was applied to the memory device. This process was repeated until the memory device was reset to a point where a maximum threshold voltage value is reached.

The use of multiple reset pulses to effect a partial setting of a memory device is suggested in U.S. Pat. No. 3,530,441 granted to S. R. Ovshinsky in the environment of an adaptive memory device which is characterized by a very gradual increase in resistance with reset energy pulse content, unlike a memory device of the type exemplified by the composition formula given above which is characterized by a very sharp increase in reset resistance with reset energy pulse content. Moreover, this patent suggests the use of multiple high reset current pulses only to establish a desired partial degree of resetting of the memory device.

A readout operation on the voltage memory matrix to determine whether a memory device at a selected crossover point is in a low or high resistance condition involves the feeding of a voltage below the threshold voltage value across the associated x and y axis conductors of the matrix which is insufficient to trigger the memory device involved when in a high resistance condition to a low resistance condition and of a polarity to cause current flow in the low impedance direction of the associated isolating element, and detecting the resulting current or voltage conditions to determine if the interrogated memory device was in a high or low resistance condition.

The reliability of memory matrices in which information is stored in computers and the like is of exceeding importance, and some difficulties have been heretofore experienced because of the degradation of the threshold voltage value of the memory device. Any threshold degradation poses a serious problem when the read voltage applied to a memory matrix exceeds the degraded threshold voltage values of the memory devices thereof because then the read voltage applied to all memory devices of the matrix will set all unset memory devices to a low resistance condition and thereby destroy the binary information stored in the matrix involved. It was discovered that one form of threshold degradation occurred when the memory devices are subjected to repeated set and reset cycles. This problem was solved by the invention disclosed in copending application Ser. No. 396,497 of William D. Buckley on Filament-Type Memory Semiconductor Device and Method of Making the Same, filed Sept. 12, 1973.

It has also been discovered that substantial degradation of the threshold voltage value of these memory devices at a given reference temperature occurs when the devices are reset in the conventional way and remain in their reset states above room ambient temperature conditions for prolonged periods of time. The present invention solves this problem.

It has been known that the threshold voltage value of a memory device of the filament type above described is a function of a number of factors, one of which is the ambient temperature to which it is subjected. Thus, a given memory device of the type described having a given threshold voltage value at room temperature has a much lower threshold voltage value at an ambient temperature of 70°C. The read voltage must thus be selected so it is lower than any expected threshold voltage value for the range of ambient temperatures required by the user's specifications. Strangely, however, as above indicated, the threshold voltage value at a given reference temperature is also a factor of the previous set and reset history, when it remains in a reset state under relatively high ambient temperature conditions for a given length of time, especially when the memory semiconductor composition of the device includes relatively large amounts of an element like tellurium, which in its elemental form has a relatively low crystallization temperature. These memory semiconductor compositions which commonly include germanium and also elements like antimony and arsenic in a homogeneous state have relatively high crystallization temperatures, much higher than any ambient temperature conditions to which the memory devices are normally subjected. However, a memory device which originally had an apparently stabilized threshold voltage value at room ambient temperature, after being stored in a reset state for a number of weeks at 70°C, had a completely degraded (i.e., zero) threshold voltage value when measured at room ambient temperature (25°C). A theory for explaining this threshold voltage degradation is that, while the application of one or more reset current pulses to a set memory device may convert the previously crystalline or more ordered filamentous path to a substantially amorphous state of the tellurium and other elements of the memory semiconductor material involved (except for some widely spaced tellurium crystallites which ensure the formation of the next current filament at the same point in the film), it is believed that there are amorphous tellurium regions distributed throughout the volume originally occupied by the crystalline tellurium filament where the tellurium is in greater concentration than in the original homogeneous amorphous composition. While there amorphous tellurium rich regions do not significantly affect the resistance or threshold voltage value of the reset memory device, they have a crystallization temperature which is very much lower than that of the original homogeneous amorphous memory semiconductor composition, and these amorphous tellurium rich regions when subjected to high ambient temperature conditions crystallize at modest ambient temperature conditions and progressively degrade the filamentous path until a continuous conductive path is formed between the electrodes of the memory device.

BRIEF DESCRIPTION OF THE INVENTION

The aforesaid problem of threshold voltage degradation under above room ambient temperature conditions in memory devices of the type described (to be referred to as filament-type memory devices) is overcome in accordance with the present invention by applying to each set memory device, after it has been reset to its maximum resistance and threshold voltage value, a number of reset voltage pulses of a magnitude in excess of the threshold voltage of the memory device. For example, in the memory devices manufactured by Energy Conversion Devices as described, the application of a total of 8 reset voltage pulses each in excess of the threshold voltage value of the memory devices involved. These reset voltage pulses which exceed the threshold voltage value of the memory device will produce additional reset current pulses of significant magnitude as did the reset voltage pulses which preceded them. These additional pulses completely eliminate the threshold degradation problem described. It is believed that the reason why such an application of reset pulses eliminates the threshold degradation problem described is that the repeated feeding of the additional reset current pulses through the dispersed amorphous tellurium rich regions initially formed in the filamentous path referred to eliminates these regions to form a substantially homogeneous region of the original multi-element composition. The application of additional reset voltage pulses in excess of the maximum threshold voltage value of the memory device does not set the device because each reset pulse is of such short duration that the resulting current flow does not result in the bulk heating and slot cooling necessary to form a crystalline filamentous path. However, the feeding of additional reset pulses requires either a limitation in the closeness of their spacing or the number of pulses so that they do not have the effect of a single continuous set pulse which bulk heats the semiconductor material to a point which produces crystallization. In the exemplary reset operation carried out by Energy Conversion Devices, Inc., the reset voltage pulses referred to were spaced apart about 100 microseconds, although a much shorter spacing could be used.

DESCRIPTION OF THE PREFERRED EMBODIMENT OF THE INVENTION

Figures 1, 2A, 2B, 3, 4:
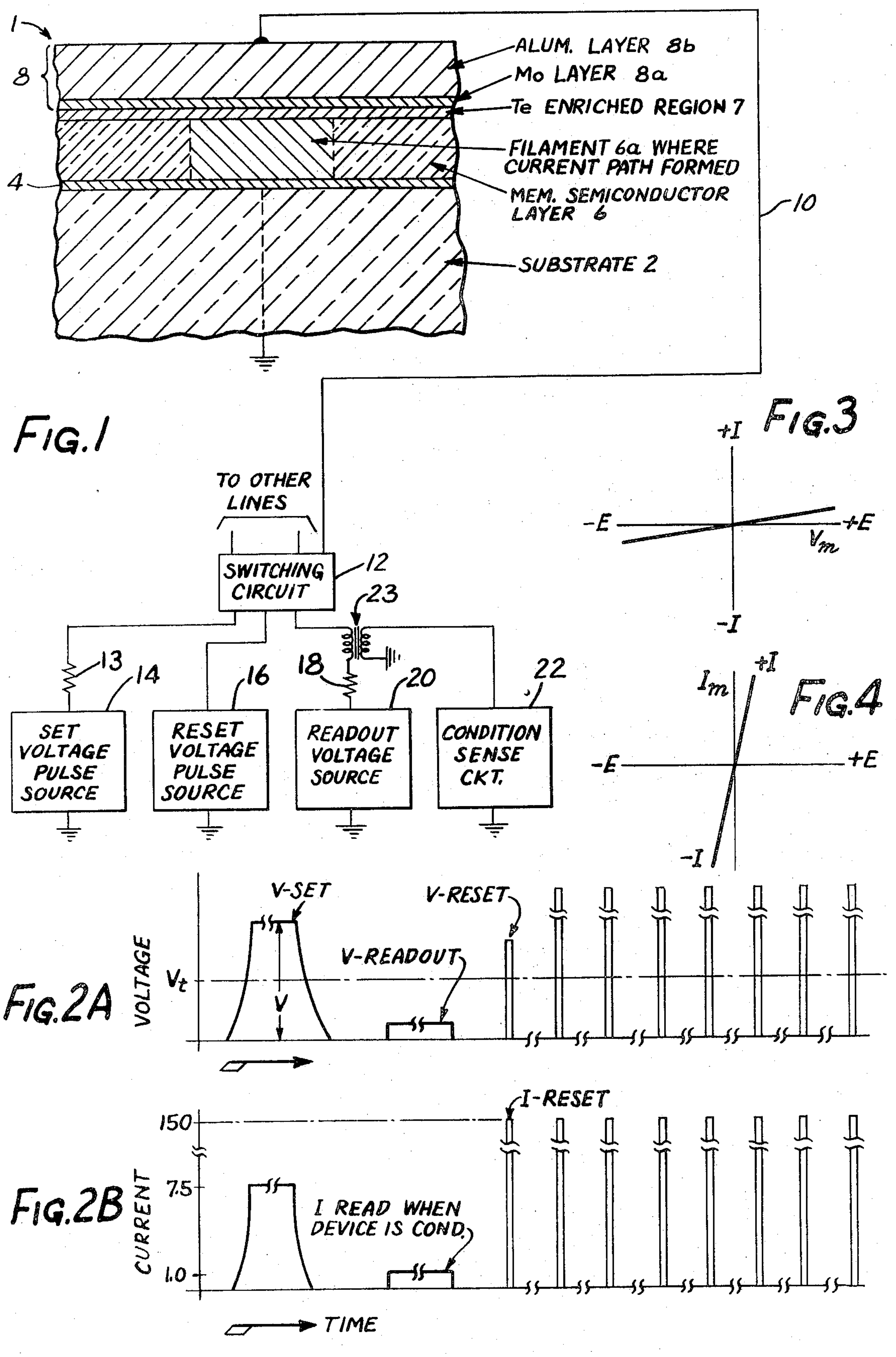
FIG. 1 illustrates a filament-forming memory device with the electrodes thereof connected to a switching circuit for switching set, reset and readout voltages thereto, the figure also indicating the filamentous path in the semiconductor material of the memory device in which current flows in the low resistance condition thereof.
FIGS. 2A and 2B illustrate various applied voltage and resulting current flow conditions of the memory device of FIG. 1 under the set, reset and low resistance readout modes of operation of the memory device.
FIGS. 3 and 4 respectively illustrate the voltage-current characteristics of the memory device of FIG. 1 respectively in the high and low resistance conditions thereof.

Referring now more particularly to FIG. 1, there is shown a fragmentary portion of a filament current path-forming memory device generally indicated by reference numeral 1. A memory device of this type may include a series of superimposed sputter deposited films upon a substrate 2 which, in the case of a memory matrix, may be the exposed apertured portion of an insulation covered rectifier or transistor-forming silicon chip substrate, and in the case of discrete devices would most likely be a substrate of a suitable insulating material. Deposited as a first coating upon the substrate 2 is an electrode 4 which may be a conductive material like amorphous molybdenum, palladium silicide or the like. Upon the electrode 4 is preferably sputter deposited in active memory semiconductor material film or layer 6. The interface between the electrode 4 and the memory semi-conductor film 6 makes an ohmic contact (rather than a rectifying or contact generally associated with *p-n* junction devices). The memory semiconductor layer 6, as previously indicated, is most preferably a chalcogenide material having as major elements thereof tellurium and germanium, although the actual composition of the memory semi-conductor material useful for the memory semiconductor layer 6 can vary widely in accordance with the broader aspects of the invention.

Preferably sputter deposited on the memory semiconductor layer 6 is a tellurium enriched region 7 (in accordance with the invention of copending application Ser. No. 396,497 of William D. Buckley on Filament-Type Memory Semiconductor Device and Method of Making the Same) or other equivalent material which enables the threshold voltage value of the memory device to be stabilized for a given ambient temperature after about 10 to 20 set-reset cycles of operation performed by the manufacturer. Memory device 1 has an outer electrode generally indicated by reference numeral 8 and generally comprises an inner barrier-forming layer 8*a* of an ohmic contact-forming refractory metal like molybdenum, preferably amorphous molybdenum, which is sputter deposited upon the memory semiconductor layer 6, and a more highly conductive outer layer 8*b* of aluminum of other highly conductive metal, such as copper, gold, or silver. The barrier-forming layer 8*a* prevents migration of the aluminum or other highly conductive metal through the tellurium enriched region into the memory semiconductor layer 6 which would render the same permanently conductive and destroy the desired electrical switching characteristics thereof when the outer electrode is positive with respect to the inner electrode 4.

A conductor 10 is shown interconnecting the outer electrode layer 8*b* to a switching circuit 12 which can selectively connect the positive terminal of a set voltage pulse source 14, a reset voltage pulse source 16 or a readout voltage pulse source 20 to the outer electrode. The inner or bottom electrode 4 of the memory device 1 and the other terminals of the various voltage sources described are all shown connected to ground. In the connection between the switching circuit 12 and the set voltage source 14 is shown a current limiting resistor 13, and in the connection between the switching circuit 12 and the positive terminal of the readout voltage source 20 is shown a voltage divider resistor 18. The reset voltage pulse source 16 is preferably a constant current low resistance source which automatically develops a voltage which produces a fixed amplitude current pulse (such as an exemplary 100–200 milliamp pulse). Once a memory device is reset to its maximum resistance and threshold voltage value state (which can occur after the first reset pulse), the constant current source develops a voltage in excess of the maximum threshold voltage value thereof to be able to develop a reset current pulse in the relatively high resistance reset material. As previously indicated, in the prior art, it was thought desirable to generate a reset current pulse by application of a reset voltage pulse generated by the reset voltage pulse source which has an amplitude less than the maximum threshold voltage value of the memory device involved.

Examplary outputs of the voltage sources 14, 16 and 20 are illustrated in FIG. 2A and the exemplary currents produced thereby are illustrated in FIG. 2B below the corresponding voltage pulses involved. As thereshown, the portion of the voltage output of the set voltage source 14 initially appearing across the memory device electrodes will be in excess of the threshold voltage value $V_t$ of the memory device 1, whereas the portion of the output of the readout voltage source 20 appearing thereacross must be less than the threshold voltage value of the memory device 1. (The resistance of the memory device 1 when in the high resistance state is usually so much higher than the resistance 13 in series therewith that it can be assumed that substantially the entire output voltage of set voltage source 14 appears across the device electrodes.) Since the threshold voltage value of a memory device generally increases with decrease in temperature, the set voltage pulses are commonly over twice the room ambient temperature threshold voltage value thereof to accommodate low ambient temperature conditions. When the reset voltage pulse source 16 is a constant current source, at least the initial pulse would be below the maximum threshold voltage value of the memory device, and if this single pulse fully reset the device to its maximum threshold voltage value all other pulses would be in excess of this value.

In the reset state of a previously set memory device 1, the memory semiconductor layer 6 thereof is substantially an amorphous material throughout and acts substantially as an insulator so that the memory device is in a very high resistance condition. When a set voltage pulse is applied across its electrodes 4 and 8 which exceeds the threshold voltage value of the memory device, current starts to flow in a filamentous path 6*a* in the amorphous semiconductor layer 6 thereof which path is believed to be heated above its glass transition temperature. The filamentous path 6*a* is generally under 10 microns in diameter, the exact diameter thereof depending upon the value of the current flow involved. The current resulting from the application of the set voltage pulse source may be under 10 milliamps. Upon termination of the set voltage pulse 14, because of what is believed to be the bulk heating of the filamentous path 6*a* and the surrounding material due to the relatively long duration current pulse, and the nature of the crystallizable amorphous composition of the layer 6, such as the germanium-tellurium compositions described, one or more of the composition elements, mainly tellurium in the exemplary composition, crystallizes in the filamentous path. This crystallized material provides a low resistance current path so that upon subsequent application of the readout voltage from the source 20 current will readily flow through the filamentous path 6*a* of the memory device 1 and the voltage across the electrodes of the memory device becomes a factor of the relative value of the memory device resistance and the voltage divider resistor 18 in series therewith.

The high or low resistance condition of the memory device 1 can be determined in a number of ways, such as by connecting a voltage sensing circuit between the electrodes 8 of the memory device 1, or, as illustrated, by providing a current transformer 23 of the like in the line extending from the readout voltage source 20 and providing a condition sensing circuit 22 for sensing the magnitude of the voltage generated in the transformer output. If the device 1 is in its set low resistance condition, the condition sensing circuit 22 will sense a relatively low voltage pulse and when the device 1 is in its reset high resistance condition it will sense a relatively large voltage pulse. The current which generally flows through the filamentous path 6*a* of the memory device 1 during the application of a readout voltage pulse is of a very modest level, such as 1 milliamp.

FIG. 3 shows the variation in current flow through the memory device 1 with the variation in applied voltage applied when the memory device is in its relatively high resistance reset condition and FIG. 4 illustrates the variation in current with the variation in voltage applied across the electrodes 4 and 8 thereof when the memory device is in its relatively low resistance set condition.

As previously indicated, the present invention solves a threshold degradation problem when the memory device is stored in a reset state a relatively high ambient temperature conditions. When a short duration reset current pulse is applied to a set memory device 1 which is capable of substantially completely converting the crystalline filamentous path 6*a* into an amorphous state, the memory device will have a maximum resistance and threshold voltage value. However, as previously indicated, a single application of such a reset current pulse does not generally produce a homogeneous amorphous region in this path. Rather, it produces spaced regions of the basic elements of the composition involved of varying richness of the elements. This effects the stability of the threshold voltage value of the memory device when the crystallization temperature of one or more of these regions drops to the level of the ambient temperature conditions of the device. Elemental tellurium cyrstallizes at a temperature well below room temperature and so areas of the composition more rich in amorphous tellurium than the original amorphous composition (which have a crystallization far in excess of the highest expected ambient temperature condition of the memory device) can crystallize at modest elevated temperatures. It was discovered that this problem is eliminated by feeding a plurality of current reset pulses following the application of one or more reset pulses which have completely reset the memory device to a condition where it has its maximum threshold voltage value. Each such additional reset current pulse is achieved by the application of a reset voltage pulse in excess of the threshold voltage value of the memory device, to cause a current pulse which, while of insufficient duration to set the filamentous path into a crystalline or more ordered state, will progressively homogenize the same.

The present invention has thus materially improved the reliability of memory devices of the filament type and has resulted in a marked increase in the utility of memory devices of the type described.

It should be understood that numerous modifications may be made in the most preferred forms of the invention described without deviating from the broader aspects of the invention.

I claim:

1. A method of resetting a filament-type memory device including spaced electrodes between which extend a body of generally amorphous substantially nonconductive memory semiconductor material which, when a set voltage pulse in excess of a given threshold voltage value and duration is applied to said electrodes, has formed therein a crystalline low resistance filamentous path resettable into a generally amorphous condition by application of one or more reset voltage pulses producing reset current pulses through said filamentous path which heat the same to a temperature which dissipates the crystalline filament and are of a duration which is so short that upon termination of each reset current pulse the filamentous path will be quickly quenched to leave at least portions of the filamentous path in a substantially amorphous condition, said method comprising: first applying to said electrodes one or more reset voltage pulses which produce a reset current pulse or pulses which substantially completely convert the crystalline filamentous path to a substantially amorphous filamentous path where the memory device has its maximum resistance and threshold voltage value, and then applying to said electrodes one or more additional reset voltage pulses each in excess of the maximum threshold voltage value of the memory device which additional voltage pulses cause an additional reset current pulse or pulses to flow through the high resistance filamentous path to homogenize the same and prevent crystallization from developing therein due to high ambient temperature storage of the memory device.

2. The method of claim 1 wherein said memory semiconductor material has the general formula:

$$Ge_A Te_B X_C Y_D$$

where:

A=5 to 60 atomic percent
B=30 to 95 atomic percent
C=0 to 10 atomic percent when $x$ is Antimony (S*b*) or Bismuth (B*i*)

or

C=0 to 40 atomic percent when $x$ is Arsenic (A*s*)
D=0 to 10 atomic percent when $y$ is Sulphur (S)

or

D=0 to 20 atomic percent when $y$ is Selenium (S*e*).

3. The method of claim 1 wherein each of said reset current pulses is of a magnitude to heat substantially the entire filament above the glass transition temperature thereof.

4. In combination, a filament-type memory device including spaced electrodes between which extend a body of generally amorphous substantially non-conductive memory semiconductor material which, when a set voltage pulse in excess of a given threshold voltage value and duration is applied to said electrodes has formed therein, a crystalline low resistance filamentous path resettable into a generally amorphous condition by application of one or more reset voltage pulses producing reset current pulses through said filamentous path which heat the same to a temperature which dissipates the crystalline filament and are of a duration which is so short that upon termination of each reset current pulse the filamentous path will be quickly quenched to leave at least portions of the filamentous path in a substantially amorphous condition; and a source of reset voltage pulses selectively connectable to said electrodes for applying an initial set voltage pulse or pulses which produces a reset current pulse or pulses which substantially completely convert the crystalline filamentous path to a substantially amorphous filamentous path where the memory device has its maximum resistance and threshold voltage value and subsequent reset voltage pulses each in excess of the maximum threshold voltage value of the memory device which additional voltage pulses cause additional reset current pulses to flow through the high resistance filamentous path to homogenize the same and prevent crystallization from developing therein due to high ambient temperature storage of the memory device.

5. The combination of claim 4 wherein said source of reset voltage pulses is a constant current source which automatically produces a sufficient output voltage to produce constant amplitude reset current pulses independently of the impedance value of the memory device.

6. The combination of claim 5 wherein said memory semiconductor material has the general formula:

$$Ge_A Te_B X_C Y_D$$

where:

A=5 to 60 atomic percent
B=30 to 95 atomic percent
C=0 to 10 atomic percent when $x$ is Antimony (S*b*) or Bismuth (B*i*)

or

C=0 to 40 atomic percent when $x$ is Arsenic (A*s*)
D=0 to 10 atomic percent when $y$ is Sulphur (S)

or

D=0 to 20 atomic percent when $y$ is Selenium (S*e*).

7. In combination, a memory device which includes a pair of spaced electrodes between which extends a body of generally amorphous substantially non-conductive memory semi-conductor material made of a composition of at least two elements, said composition when a set voltage pulse in excess of a given threshold voltage value is applied to said electrodes for a given period becoming conductive as current flows through a filamentous path therein, termination of said set voltage pulse leaving said filamentous path as a crystalline relatively low resistance deposit of at least one of said elements, and after one or a few current reset pulses of a given amplitude and duration much less than said given period are fed through said filamentous path, said path is in a substantially amorphous condition where the memory device has its maximum resistance and threshold voltage value, said reset filamentous path being a non-homogeneous composition of said elements with various regions thereof containing greater concentrations of said elements in the amorphous state than other regions thereof; and a reset circuit for said memory device for selectively applying across said spaced electrodes during each reset operation a plurality of reset voltage pulses, the initial pulse or pulses of which leave said path in said substantially amorphous condition where the device has said maximum resistance and threshold voltage value and at least the subsequent reset voltage pulses of which exceed said maximum threshold value to cause additional reset current pulses to flow in said filamentous path, which homogenize said non-homogeneous regions of said filamentous path.

8. The combination of claim 7 wherein said at least one element of the memory semiconductor material of said memory device has a crystallization temperature at or below 70°C, and the crystallization temperature of said composition of amorphous semiconductor material is greatly in excess of 70°C.

9. The combination of claim 8 wherein said memory semiconductor material has the formula:

$$Ge_A Te_B X_C Y_D$$

where:

A=5 to 60 atomic percent
B=30 to 95 atomic percent
C=0 to 10 atomic percent when $x$ is antimony (S*b*) or Bismuth (B*i*)

or

C=0 to 40 atomic percent when $X$ is Arsenic (A*s*)
D=0 to 10 atomic percent when $Y$ is Sulphur (S)

or

D=0 to 20 atomic percent when $Y$ is Selenium (S*e*).

* * * * *